United States Patent [19]

van Swam et al.

[11] Patent Number: 4,689,193
[45] Date of Patent: Aug. 25, 1987

[54] MECHANISM FOR TESTING FUEL TUBES IN NUCLEAR FUEL BUNDLES

[75] Inventors: Leo F. van Swam, Richland; Quang D. Ho, West Richland, both of Wash.

[73] Assignee: Exxon Nuclear Company Inc., Richland, Wash.

[21] Appl. No.: 660,787

[22] Filed: Oct. 15, 1984

[51] Int. Cl.⁴ ............................................. G21C 17/00
[52] U.S. Cl. .................................... 376/251; 376/252
[58] Field of Search ............... 376/249, 251, 252, 245, 376/233, 260–264, 268–271; 74/474, 567; 414/749, 750; 901/12, 41

[56] References Cited

U.S. PATENT DOCUMENTS

| | | | |
|---|---|---|---|
| 1,736,151 | 11/1929 | Fawick | 74/474 |
| 3,411,636 | 11/1968 | Wallis | 414/750 |
| 3,521,760 | 7/1970 | Wallis | 414/750 |
| 4,053,356 | 10/1977 | Brammer | 376/271 |
| 4,061,232 | 12/1977 | Sickles | 414/750 |
| 4,147,589 | 4/1979 | Roman et al. | 376/233 |
| 4,158,602 | 7/1979 | Minnick | 376/233 |
| 4,464,332 | 8/1984 | Boisseuil et al. | 376/215 |

FOREIGN PATENT DOCUMENTS 2659555  7/1978  Fed. Rep. of Germany ...... 376/252

Primary Examiner—Salvatore Cangialosi
Attorney, Agent, or Firm—Volker R. Ulbrich; Kenneth R. Schaefer; Kenneth Watov

[57] ABSTRACT

A mechanism for testing fuel tubes in nuclear fuel bundles includes a carriage, carrying an elongated probe, and a grooved plate. The grooves are parallel to the probe and are spaced by the same distances as rows of tubes in the fuel bundle. They are connected at at least one end. A pin on the carriage fits in the grooves. A hydraulic cylinder reciprocates the carriage longitudinally of the grooves and a pneumatic cylinder urges it laterally, so that the pin moves from groove to groove at the end of each stroke.

3 Claims, 3 Drawing Figures

MECHANISM FOR TESTING FUEL TUBES IN NUCLEAR FUEL BUNDLES

INTRODUCTION

Nuclear fuel elements are ordinarily in the form of long, slender rods which are grouped in assemblies of square cross-sections with the fuel rods arranged in parallel spaced rows. After the fuel elements have been exposed in a nuclear reactor for a given length of time, it is necessary to remove them and subject them to various inspections. For example, they may be checked for spacing, since the rods frequently grow and flex under exposure in the reactor. It is also necessary to check for failed rods by ultrasonic techniques as disclosed in the pending Application of Leo F. van Swam, Thomas R. Blair, and Quang D. Ho, Ser. No. 660,786, entitled, "Method and Apparatus for Detecting Failed Fuel Rods", filed of even date herewith and assigned to the assignee of this application. These tests and others require the insertion of probes between the rows of fuel elements. Since the irradiated fuel elements are highly radioactive, it is necessary that this be done under water in order to remove heat caused by the decay of fission products, as well as to protect persons working with them from radiation.

It is the object of this invention to provide an apparatus for rapidly and accurately inserting a probe between successive rows of fuel elements in a fuel assembly under remote operating conditions. It can also be used to check the peripheral rods with a variety of other instruments.

SUMMARY OF THE INVENTION

According to our invention, we provide a reciprocating means for moving an instrument parallel to the rows of fuel elements. Associated with the reciprocating means is a grooved plate. The grooves are open at one end and are faced by a deflecting plate. A pin mounted on the carrier for the probe moves in these grooves. A pressure means exerts a constant lateral pressure on the carriage and pin. At the end of each stroke, this causes the pin to be moved to an adjoining groove carrying with it the carriage. When all the grooves have been traversed, the operator reverses the direction of pressure exerted by the pressure means, causing the pin to return to its original position. This enables the probe to rapidly and accurately traverse all of the rows of fuel elements in the fuel assembly.

DETAILED DESCRIPTION

The apparatus will now be described in connection with the ultrasonic testing means disclosed and claimed in the application identified above.

Figure 1:
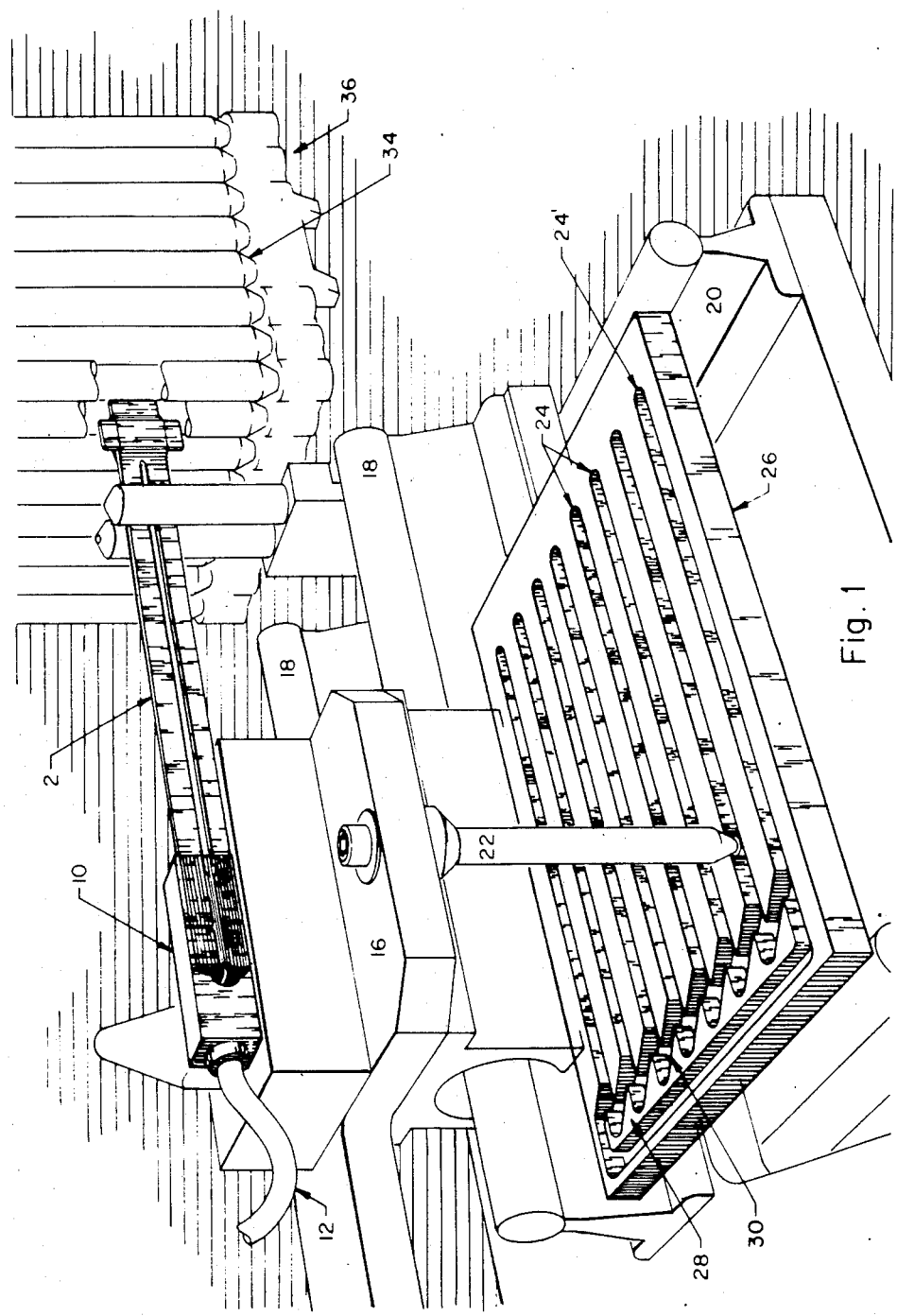
FIG. 1 is a perspective view of our apparatus in relation to a fuel assembly being tested.
Figure 2:
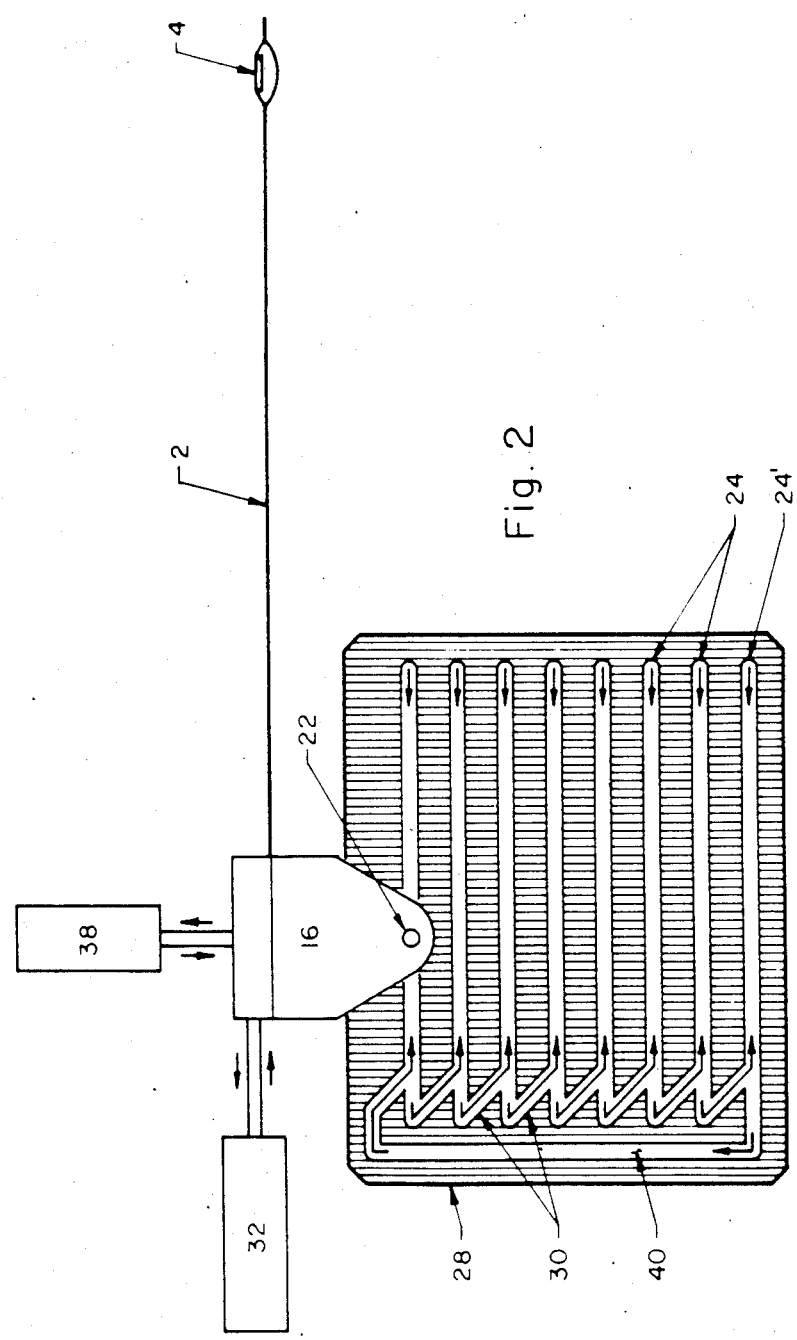
FIG. 2 is a diagramatic view showing the operation of the apparatus of FIG. 1.
Figure 3:
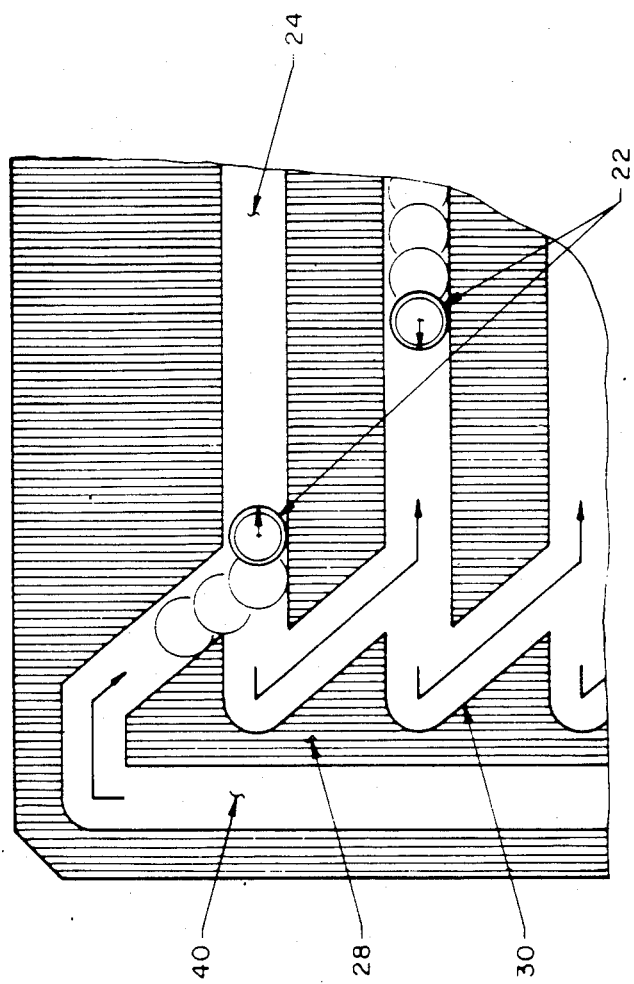
FIG. 3 is an enlarged view of a corner of plate 26, showing movement of pin 22.

FIGS. 1, 2, and 3 show the operating means by which the probe is inserted into the fuel assembly. The mounting block 10 is carried on a carrier 16, which rides on rails 18, 18', which provide for longitudinal movement, and on rails 20 which provide for transverse movement. A guide pin 22 slides in grooves 24 of index plate 26. The grooves 24 are open at one end, shown at the left in FIGS. 1 and 2, and are faced by deflection member 28 which is provided with multiple deflecting surfaces 30, each of which faces one of the grooves 24. The actuating means, which are not shown on FIG. 1, are indicated diagrammatically on FIG. 2. A reciprocating hydraulic cyclinder 32 moves carrier 16 and probe 2 longitudinally of the latter so that the transducer at the free and of the probe is moved along a row of fuel rods 34 in fuel assembly 36. At the same time, pneumatic cylinder 38 exerts a continuous pressure laterally. Under the influence of these cylinders, the pin 22 moves longitudinally along a groove 24 to the right in FIG. 1, then returns. When it reaches the left-hand end of the groove, the force of pressure cylinder 38 drives it laterally along the deflecting surface 30 to the next groove 24, as best shown in FIG. 3. These grooves are spaced apart the same distance as the rows of fuel elements 34. The transducer, therefore, passes successively along the rows of fuel elements in the fuel assembly 36. When the pin 22 has moved in both directions along the last groove 24, indicated as 24', the operator reverses the direction of pressure exerted by pressure cylinder 38. The pin 22 then moves back along the groove 40 at the end of index plate 26 to the starting position, carrying with it the carrier 16 and the probe 2.

Plate 26 can be exchanged to provide indexing for different fuel assemblies having differing numbers of rows of rods and/or differing spacing between rows.

While we have described in detail one embodiment of our invention, it will be apparent to those skilled in the art that various changes can be made. We therefore wish our patent coverage to be limited solely by the appended claims.

We claim as our invention:

1. Apparatus for testing the fuel rods of a nuclear fuel assembly, said rods being arranged in parallel rows, comprising a probe, a carrier for guiding and moving said probe, means for guiding said carrier and said probe in a predetermined pattern in straight lines parallel to said rows and at right angles to the axes of said tubular members, said means comprising a substantially horizontal stationary groove plate having parallel grooves in its upper surface, means on said carrier for engagement within said grooves, reciprocating means for moving said carrier parallel to said rows, means for moving said carrier perpendicular to said rows at the end of each stroke to move said probe from one row of tubular members to another and said groove plate further comprising deflective means facing one end of each of said grooves and extending between each adjacent pair of grooves to guide said carrier from one groove to the next in sequence.

2. Apparatus as defined in claim 1, wherein said grooves are each open at one end, said means for engagement within said grooves is a pin substantially perpendicular to said plate, said deflective means faces the open ends of said grooves and comprises deflecting surface, each of which extends between two adjacent grooves, and said apparatus further comprises pressure means exerting pressure on said carrier laterally of said grooves, whereby at the end of said stroke, said pin is guided from one groove to an adjacent groove until the last groove is reached.

3. Apparatus as defined in claim 2, wherein said plate includes a return groove separated from the open ends of said parallel grooves, other than the two extreme grooves, and joined to said two extreme grooves, whereby, when pressure is reversed on said pressure means, said pin, carrier, and probe will return to their starting positions.

* * * * *